United States Patent [19]

Smyth et al.

[11] Patent Number: 4,610,536
[45] Date of Patent: Sep. 9, 1986

[54] LASER SCANNING AND PRINTING APPARATUS

[75] Inventors: William K. Smyth, Sudbury; Richard J. Chen, Winchester; William T. Plummer, Concord, all of Mass.

[73] Assignee: Polaroid Corporation, Cambridge, Mass.

[21] Appl. No.: 730,828

[22] Filed: May 6, 1985

[51] Int. Cl.⁴ .................... H04N 1/46; G03B 33/12
[52] U.S. Cl. ..................................... 355/38; 355/37; 355/67; 358/63; 358/75
[58] Field of Search ............. 355/37, 38, 4, 3 R, 355/14 C, 14 R, 70, 67; 358/63, 75, 78, 44, 80, 53, 199, 285; 178/15; 350/266, 273

[56] References Cited

U.S. PATENT DOCUMENTS

| | | | |
|---|---|---|---|
| 3,539,942 | 11/1970 | Buchsbaum | 331/94.5 |
| 3,622,690 | 11/1971 | Stephens et al. | 178/5.2 R |
| 3,894,182 | 7/1975 | Yamamoto et al. | 178/7.6 |
| 3,997,722 | 12/1976 | Bardos | 178/7.6 |
| 4,012,776 | 3/1977 | Mrdjen | 358/63 X |
| 4,021,845 | 5/1977 | Wang | 358/75 |
| 4,068,197 | 1/1978 | Yamazaki et al. | 331/94.5 S |
| 4,087,838 | 5/1978 | Masaki et al. | 358/199 |
| 4,093,976 | 6/1978 | Das | 358/53 |
| 4,110,788 | 8/1978 | Merry | 358/63 |
| 4,274,109 | 6/1981 | Whitby | 358/53 |
| 4,346,401 | 8/1982 | Ohara | 358/75 |
| 4,394,089 | 7/1983 | McIntosh et al. | 355/38 X |
| 4,423,426 | 12/1983 | Kitamura | 346/108 |
| 4,463,374 | 7/1984 | Thompson | 358/75 X |
| 4,464,677 | 8/1984 | Kuhn et al. | 358/75 |
| 4,499,489 | 2/1985 | Gall et al. | 358/75 |
| 4,535,413 | 8/1985 | Shiota et al. | 355/38 X |
| 4,558,357 | 12/1985 | Nakagawa et al. | 358/75 |
| 4,562,462 | 12/1985 | Egan | 358/75 |
| 4,564,859 | 1/1986 | Knop et al. | 358/75 |
| 4,565,441 | 1/1986 | Evans et al. | 355/37 |

OTHER PUBLICATIONS

"Charge-Coupled Device Image Acquisition for Digital Phase Measurement Interferometry", Optical Engineering, Jul./Aug. 1984, vol. 23(4), pp. 371-378.

Primary Examiner—A. C. Prescott
Attorney, Agent, or Firm—Edward S. Roman

[57] ABSTRACT

A laser scanning and printing apparatus operates to scan an original picture in generally low resolution to provide a minimal quantity of image data which may be modified to provide an enhanced image reproduction of the original by subsequently laser scanning the original and directing the laser light reflected from the original to expose a photosensitive material, the intensity of the laser light being modulated to effect the enhanced image reproduction by selectively lightening or darkening predetermined areas of the photosensitive material exposed by the laser light reflected from the original picture during the subsequent line scan thereof.

29 Claims, 1 Drawing Figure

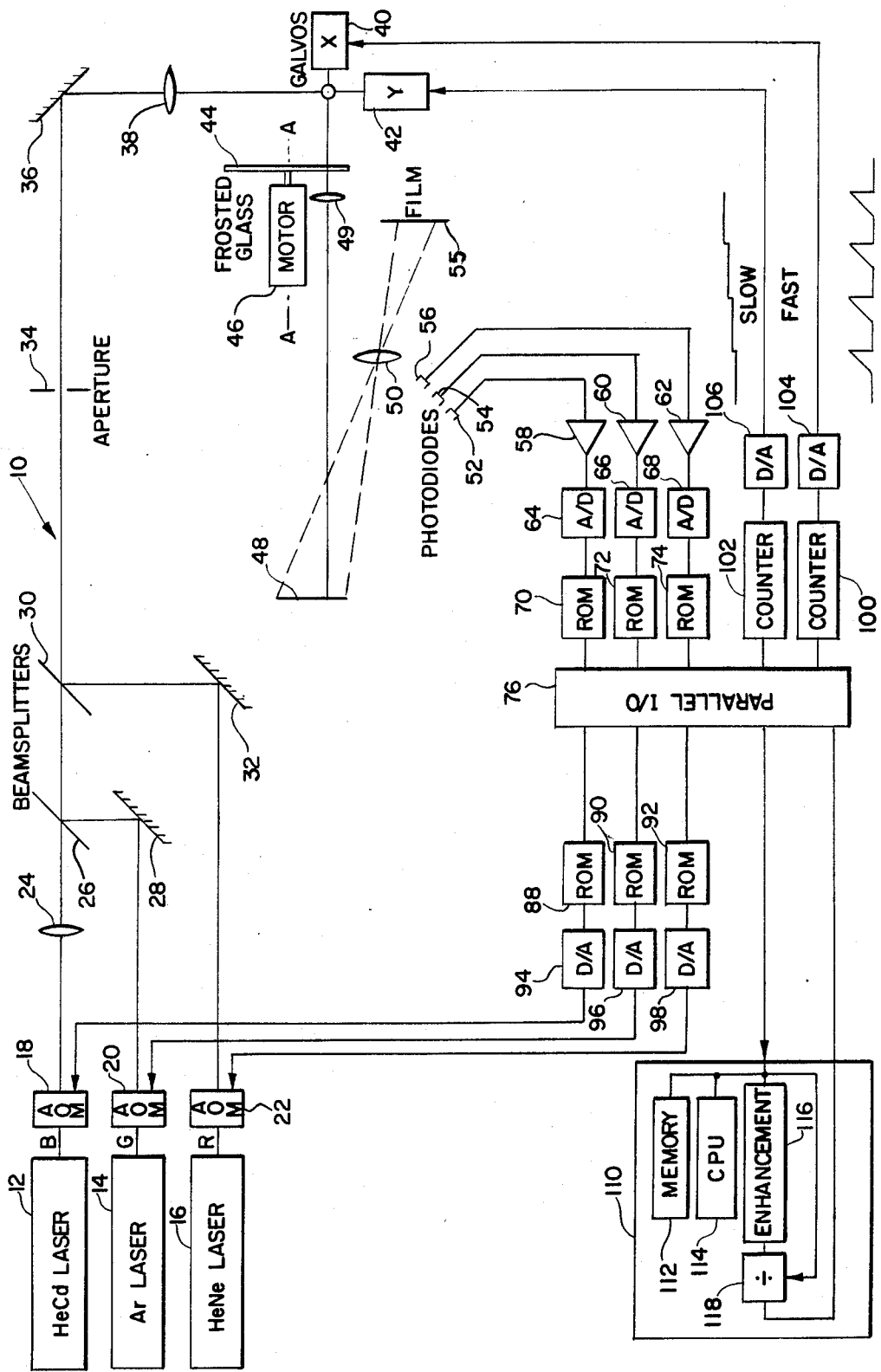

LASER SCANNING AND PRINTING APPARATUS

BACKGROUND OF THE INVENTION

1. Field of the Invention

This invention relates generally to a laser scanning and printing apparatus and, more particularly, to a laser scanning and printing apparatus for making high resolution enhanced image duplicates of original pictures scanned only in low resolution.

2. Description of the Prior Art

Laser scanning and printing apparatus are well known in the art. One such example of a laser scanning and printing apparatus that utilizes a laser to simultaneously provide a first laser beam for scanning an original pattern to derive pattern signals corresponding to the tones in the original pattern and a second laser beam for projecting recording light upon a recording medium is disclosed in U.S. Pat. No. 3,622,690, entitled "Electronic Scanner Utilizing a Laser for the Simultaneous Scanning and Reproducing of Images", by A. Stephens et al., issued November 23, 1971. The laser color scanner and printer of the Stephens et al. patent also includes a color correction computer to correct for the deficiencies in the printing dyes. Thus, patterns, photographs, pictures, etc. are scanned in laser light and converted to electronic signal information by photoresponsive devices which detect the scanning beam. The electronic signal information is thereafter modified by the appropriate algorithms to provide an enhanced image upon the printing of the reproduction. During the printing process for the reproduction, laser light modulated in accordance with the enhanced electronic signal information is line scanned across the surface of a photosensitive material to directly expose a duplicate image of the original pattern. Since the laser light is utilized directly to line scan and expose the photosensitive material for the reproduction, the original picture or pattern must be line scanned and sensed in high resolution in order to provide a high resolution duplicate. Thus, the resolution of the duplicate image can be no greater than the resolution at which the original pattern or picture is line scanned.

Line scanning the original pattern or picture in high resolution to provide image data for each minute picture element or pixel results in the provision of an enormous quantity of image data. This enormous quantity of image data is greatly expanded if converted from an analog format to a digital format as is generally preferred in high quality electronic imaging systems. This enormous quantity of image data must also be processed in the aforementioned manner to provide such electronic image enhancements as color correction thereby necessitating large complex computers and long image processing times.

Therefore, it is a primary object of this invention to provide a laser scanning and printing apparatus for providing a high resolution enhanced image duplicate of an original picture scanned in generally low resolution to provide only a minimal quantity of image data.

It is a further object of this invention to provide a laser scanning and printing apparatus in which a minimal quantity of image data derived from scanning an original print in low resolution may be processed to provide an enhanced image high resolution duplicate.

Other objects of the invention will be in part obvious and will in part appear hereinafter. The invention accordingly comprises a mechanism and system possessing the construction, combination of elements and arrangement of parts which are exemplified in the following detailed disclosure.

SUMMARY OF THE INVENTION

An apparatus for scanning an original picture and printing a reproduction thereof by exposing a photosensitive material comprises a source of coherent laser light. Means are provided for modulating the intensity of the laser light provided by the source of coherent laser light. Means are provided for line scanning the modulated laser light over the surface of the original picture. Photoresponsive means detect the light intensity reflected from the original picture during a first line scan thereof by the laser light modulated at substantially constant intensity and provide an electronic information signal corresponding to the intensity of the reflected light. Control means respond to the electronic information signal to provide a control signal to the modulating means to modulate the intensity of the laser light during a succeeding second line scan of the original picture by the laser light. Means are provided for directing light reflected from the original picture during the second line scan to the photosensitive material to expose a reproduction of the original picture. The control signals from the control means operate to modulate the intensity of the laser light in a manner effecting selective lightening or darkening of selected areas of the photosensitive material exposed by the laser light reflected from the original picture.

DESCRIPTION OF THE DRAWING

The novel features that are considered characteristic of the invention are set forth with particularity in the appended claims. The invention itself, however, both as to its organization and its method of operation, together with other objects and advantages thereof will be best understood from the following description of the illustrated embodiment when read in connection with the accompanying drawing wherein:

The drawing is a schematic block diagram for the laser scanning and printing apparatus of this invention.

DESCRIPTION OF THE PREFERRED EMBODIMENT

Referring to the drawing, there is shown generally at 10 the laser scanning and printing apparatus of this invention comprising three coherent laser light sources 12, 14 and 16. The laser light source 12 comprises a helium cadmium laser for providing a blue beam of light, the laser light source 14 comprises an argon laser for providing a green beam of light, and the laser light source 16 comprises a helium neon laser for providing a red beam of light. The output light beams from the laser light sources 12, 14 and 16 are modulated respectively by acousto-optic modulators 18, 20 and 22. The blue laser light beam emanating from the light modulator 18 is directed by way of a non-achromatic positive lens 24 to a dichroic mirror 26 wherein it is combined with the green laser light beam reflected to the dichroic mirror 26 by a reflecting surface 28. The composite blue-green laser light beam is thereafter directed to a dichroic mirror 30 wherein it is combined with the red laser light beam reflected to the dichroic mirror 30 by another reflecting surface 32.

The composite blue-green-red laser light beam is thereafter directed through an aperture 34 which blocks unwanted diffracted orders. The composite light beam is thereafter reflected from another reflecting surface 36 for transmission through another non-achromatic positive lens 38 to a pair of XY galvanometer mirrors as shown generally at 40 and 42. The composite colored laser light beam is reflected by the XY galvanometer mirrors 40, 42 through a ground or frosted glass 44 which is rotatably driven about axis AA by a motor 46. The ground glass 44 operates to change the composite colored laser light beam from coherent light to incoherent light for reasons which will become apparent from the following discussion. The spot of light projected onto the ground glass 44 is thereafter focused by an achromatic positive lens 49 onto an original picture receiving plane as shown at 48.

The light reflected from the picture plane 48 is directed by a positive objective lens 50 to a film plane 55 on which a photosensitive material may be stationed. Light reflected from the picture plane 48 is also received by three photoresponsive elements 52, 54 and 56 wherein the photoresponsive element 56 is filtered to detect only reflected blue light, the photoresponsive element 54 is filtered to detect only reflected green light and the photoresponsive element 52 is filtered to detect only reflected red light. Each of the photoresponsive elements 52, 54 and 56 provides an analog electronic information signal corresponding to the intensity of the particular colored light reflected thereto. The electronic information output signals from the photodetectors 52, 54 and 56, in turn, are amplified respectively by amplifiers 58, 60 and 62 and thereafter converted respectively from analog format signals to digital format signals by analog-to-digital converters 64, 66 and 68. The digital electronic information signals from the converters 64, 66 and 68 are thereafter respectively directed to read only memories (ROM) 70, 72 and 74 for data compression in a well-known manner prior to transfer by way of a parallel input/output device 76 to a computer as shown generally at 110.

The computer 110 may comprise a memory 112, a central processing unit (CPU) 114 and an image enhancing block 116. The output signal from the image enhancing block 116 is thereafter directed by way of a divide circuit 118 back to the parallel input/output device 76 and then to respective read only memory circuits (ROM) 88, 90 and 92. Galvanometer drive signals are also provided from the parallel input/output device 76 by way of counters 100, 102 and digital-to-analog converters 104, 106 to the X and Y galvanometer mirrors 40 and 42, respectively. Output signals from the read only memories 88, 90 and 92, in turn, are directed respectively to digital-to-analog converters 94, 96 and 98 for conversion from a digital format back to an analog format for controlling the light modulating response of the acousto-optic modulators 18, 20 and 22 respectively.

The laser scanning and printing apparatus 10 of this invention may be operated in the following manner. An original picture which may comprise a photograph, document, painting, etc. is stationed on the picture receiving plane 48 and line scanned with a uniform intensity composite colored beam received from the laser light sources 12, 14 and 16. The acousto-optic modulators 18, 20 and 22 thus operate to maintain a uniform laser beam light intensity from the blue, green and red laser beams, respectively. The composite colored laser beam is line scanned over the two-dimensional face of the picture stationed at the picture receiving plane 48 by the XY galvanometer mirrors 40 and 42 which are controlled in a well-known manner by way of counters 100, 102 and digital-to-analog converters 104, 106, respectively. The change in the composite colored laser light from coherent to incoherent light by the ground glass 44 operates to eliminate any speckle effect which is normally associated with coherent laser light.

The photoresponsive elements 52, 54 and 56 detect the light reflected from the original picture at the plane 48 in the three red, green and blue color components and provide corresponding analog electronic information output signals. The analog electronic information output signals are thereafter amplified by amplifiers 58, 60 and 62 and digitized by the analog-to-digital converters 64, 66 and 68, respectively. The digitized electronic information signals are thereafter compressed in the read only memories (ROM) 70, 72 and 74 prior to transfer into the computer 110 by way of the parallel input/output device 76. The digitized electronic information signal is processed in any well-known manner by the circuit 116 to provide image enhancements such as color correction in a manner as described in U.S. Pat. No. 3,622,690, supra. The digitized and enhanced electronic information signal is thereafter directed to the divide circuit 118 for division by the digitized nonenhanced electronic information signal to provide the appropriate digitized signals for controlling the acousto-optic modulators 18, 20 and 22. The digitized acousto-optic modulator control signals are thereafter directed from the computer 110 by way of the parallel input/output circuit 76 to respective read only memories (ROM) 88, 90 and 92 from whence the signals are respectively converted from digital-to-analog format by the digital-to-analog converters 94, 96 and 98.

The original picture stationed at the picture receiving plane 48 is again line scanned across the two-dimensional face thereof by the composite colored light beam modulated by the acousto-optic modulators 18, 20 and 22 in accordance with the light modulating control signals furnished by way of the digital-to-analog converters 94, 96 and 98, respectively. The XY galvanometers 40, 42 under the influence of control signals provided by way of the counters 100, 102 and the digital-to-analog converters 104, 106, respectively, effect the two-dimensional line scan of the composite colored light beam across the face of the original picture in the aforementioned manner. The rotating ground glass 44 again operates to change the composite colored laser light beam from coherent to incoherent light in order to eliminate the aforementioned speckle effect which is normally associated with coherent laser light. The light reflected from the face of the original picture at the plane 48 is thereafter directed by way of the objective lens 50 to expose the photosensitive material stationed at the film plane 55 and thereby record on the photosensitive material a duplicate image to that of the picture stationed at the picture receiving plane 48.

The original picture stationed at the plane 48 is preferably first line scanned at uniform light intensity in generally low resolution preferably in the order of 128 pixels by 128 pixels. The analog electronic output information signals from the photoresponsive elements 52, 54 and 56 is, in turn, digitized by the analog-to-digital converters 64, 66 and 68 respectively to any one of 256 grey levels thereby resulting in a maximum of 48 kilobytes of image data to be processed by the computer 110. This small volume of image data can be quickly processed to provide the requisite control signals to the acousto-optic modulators 18, 20 and 22 during the succeeding line scan and printing operation in which the composite colored beam is reflected from the original picture to expose the photosensitive material at the film plane 55. High resolution image data which is not sensed during the first line scan of the original picture at uniform beam intensity is imputed to the duplicate by directing the light reflected from the original during the second line scan thereof to directly expose the photosensitive material. Such reflected light is directed by way of the objective lens 50 and operates to provide the high resolution fine-detailed exposure of the photosensitive material. The modulation of the intensity of the red, green and blue laser beams in the aforementioned manner during the second line scan of the original picture operates to effect a selective lightening or darkening of selected areas of the photosensitive material stationed at the film plane 55 in accordance with the desired image enhancements provided by the computer 110. Thus, since the composite colored scanning light beam is modulated in the aforementioned manner during the printing process to effect selective lightening or darkening of selected areas of the photosensitive material, there is in effect provided an automatic means for dodging and burning the photosensitive material in a manner affecting the desired image enhancements. Since the original picture is first scanned in generally low resolution to provide a minimal amount of digitized image data, there is provided a simple and economical means by which digitized image data may be processed and enhanced in a minimal amount of time to enable quick and expeditious printing of a duplicate embodying select image enhancements such as improved color saturation, color correction, etc.

Other embodiments of the invention, including additions, subtractions, deletions and other modifications of the preferred disclosed embodiments of the invention will be obvious to those skilled in the art and are within the scope of the following claims.

What is claimed is:

1. Apparatus for scanning an original picture and printing a reproduction thereof by exposing a photosensitive material, said apparatus comprising:
    a source of coherent laser light;
    means for modulating the intensity of the laser light provided by said source of coherent laser light;
    means for line scanning the modulated laser light over the surface of the original picture;
    photoresponsive means for detecting the light intensity reflected from the original picture during a first line scan thereof by said laser light modulated at substantially constant intensity and providing an electronic information signal corresponding to the intensity of said reflected light;
    control means responsive to said electronic information signal for providing a control signal to said modulating means to modulate the intensity of said laser light during a succeeding second line scan of the original picture by said laser light; and
    means for directing light reflected from the original picture during said second line scan to the photosensitive material to expose a reproduction of the original picture, said control signals from said control means operating to modulate the intensity of said laser light in a manner effecting selective lightening or darkening of selected areas of the photosensitive material exposed by said laser light reflected from the original picture.

2. The scanning and printing apparatus of claim 1 wherein said control means includes means for processing said electronic information signal to provide an enhanced electronic information signal and means for dividing said enhanced electronic signal by said non-enhanced electronic information signal to provide said control signal.

3. The scanning and printing apparatus of claim 1 including means for changing the coherent laser light to incoherent light so that incoherent laser light line scans the original picture.

4. The scanning and printing apparatus of claim 3 wherein said coherent light changing means comprises a light dispersing and transmitting medium in the path of said laser light and means for drivably moving said light dispersing and transmitting medium relative to the path of said laser light.

5. The scanning and printing apparatus of claim 4 including an achromatic positive lens for focusing the laser light from said light dispersing and transmitting medium onto the original picture.

6. The scanning and printing apparatus of claim 5 wherein said light dispersing and transmitting medium comprises a ground or frosted glass and said drive means comprises means for rotatably driving said glass about a fixed axis spaced apart from the laser light path.

7. The scanning and printing apparatus of claim 4 wherein said means for line scanning the modulated laser light operates to reflect laser light through said light dispersing and transmitting medium.

8. The scanning and printing apparatus of claim 4 wherein said means for directing light reflected from the original picture to said photosensitive material comprises an objective lens.

9. The scanning and printing apparatus of claim 1 wherein said source of laser light comprises means for providing at least two beams of laser light each having a different spectral characteristic, said modulating means operates to modulate the intensity of each beam independently of the other beam, said photoresponsive means operates to detect the reflected laser light from the original picture in each spectral characteristic to provide corresponding electronic information signals and said control means responds to each electronic information signal to provide respective control signals to said light modulators to modulate laser light beams of corresponding spectral characteristics; said scanning and printing apparatus further comprising means for combining said beams of laser light into a single beam so that only said single beam of laser light is line scanned across the surface of the original picture.

10. The scanning and printing apparatus of claim 9 including means for changing the coherent light of said single beam into incoherent light so that a single beam of incoherent laser light line scans the original picture.

11. The scanning and printing apparatus of claim 10 wherein said coherent light changing means comprises a light dispersing and transmitting medium in the path of said single beam and means for drivably moving said light dispersing and transmitting medium relative to the path of said single beam of laser light.

12. The scanning and printing apparatus of claim 11 including an achromatic positive lens for focusing the laser light from said light dispersing and transmitting medium onto the original picture.

13. The scanning and printing apparatus of claim 12 wherein said light dispersing and transmitting medium comprises ground or frosted glass and said drive means comprises means for rotatably driving said glass about a fixed axis spaced apart from the path of said single beam of laser light.

14. The scanning and printing apparatus of claim 11 wherein said means for line scanning the modulated laser light operates to reflect said single beam of laser light through said light transmitting and dispersing medium.

15. The scanning and printing apparatus of claim 11 wherein said means for directing light reflected from the original picture to said photosensitive material comprises an objective lens.

16. Printing apparatus responsive to control signals from electronic signal information derived from scanning an original picture for printing a reproduction thereof by exposing a photosensitive material, said apparatus comprising:

a source of coherent laser light;

means responsive to the control signals for modulating the intensity of the laser light provided by said source of coherent laser light;

means for line scanning the modulated laser light over the surface of the original picture; and means for directing light reflected from the original picture during said line scan to the photosensitive material to expose a reproduction of the original picture wherein said control signals modulate the intensity of said laser light in a manner effecting selective lightening or darkening of selected areas of the photosensitive material exposed by said laser light reflected from the original picture.

17. The printing apparatus of claim 16 including means for changing the coherent laser light to incoherent light so that incoherent laser light line scans the original picture.

18. The printing apparatus of claim 17 wherein said coherent light changing means comprises a light dispersing and transmitting medium in the path of said laser light and means for drivably moving said light dispersing and transmitting medium relative to the path of said laser light.

19. The printing apparatus of claim 18 including an achromatic positive lens for focusing the laser light from said light dispersing and transmitting medium onto the original picture.

20. The printing apparatus of claim 19 wherein said light dispersing and transmitting medium comprises a ground or frosted glass and said drive means comprises means for rotatably driving said glass about a fixed axis spaced apart from the laser light path.

21. The printing apparatus of claim 18 wherein said means for line scanning the modulated laser light operates to reflect laser light through said light dispersing and transmitting medium.

22. The printing apparatus of claim 18 wherein said means for directing light reflected from the original picture to said photosensitive medium comprises an objective lens.

23. The printing apparatus of claim 16 wherein: said source of laser light comprises means for providing at least two beams of laser light each having a different spectral characteristic, and said modulating means operates to modulate the intensity of each beam, said printing apparatus further comprising means for combining said beams of laser light into a single beam so that said single beam of laser light is line scanned across the surface of the original picture.

24. The printing apparatus of claim 23 including means for changing the coherent light of said single beam into incoherent light so that a single beam of incoherent laser light line scans the original picture.

25. The printing apparatus of claim 23 wherein said coherent light changing means comprises a light dispersing and transmitting medium in the path of said single beam and means for drivably moving said light dispersing and transmitting medium relative to the path of said single beam of laser light.

26. The printing apparatus of claim 25 including an achromatic positive lens for focusing the laser light from said light dispersing and transmitting medium onto the original picture.

27. The printing apparatus of claim 26 wherein said light dispersing and transmitting medium comprises a ground or frosted glass and said drive means comprises means for rotatably driving said glass about a fixed axis spaced apart from the path of said single beam of laser light.

28. The printing apparatus of claim 25 wherein said means for line scanning the modulated laser light operates to reflect said single beam of laser light through said light transmitting and dispersing medium.

29. The printing apparatus of claim 25 wherein said means for directing light reflected from the original picture to the photosensitive medium comprises an objective lens.

* * * * *